(12) United States Patent
Yee et al.

(10) Patent No.: US 7,433,193 B2
(45) Date of Patent: Oct. 7, 2008

(54) TECHNIQUES FOR CONTROLLING A POSITION OF A TRANSCEIVER MODULE RELATIVE TO A CONNECTOR

(75) Inventors: Alan Yee, Los Gatos, CA (US); Eric Wiles, Sunnyvale, CA (US); Samir Vasavda, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 386 days.

(21) Appl. No.: 11/126,993

(22) Filed: May 11, 2005

(65) Prior Publication Data

US 2006/0256521 A1 Nov. 16, 2006

(51) Int. Cl.
*H05K 7/20* (2006.01)
*G02B 6/36* (2006.01)
*H01R 13/64* (2006.01)
*F28F 7/00* (2006.01)

(52) U.S. Cl. .................. 361/715; 361/702; 439/374; 165/80.3; 385/92

(58) Field of Classification Search ............ 361/688, 361/796, 785, 816, 818, 800–801, 702, 704, 361/715; 439/633, 159, 680–681, 326, 607–610, 439/79, 374; 165/80.3; 382/92
See application file for complete search history.

(56) References Cited

U.S. PATENT DOCUMENTS

| | | | | |
|---|---|---|---|---|
| 5,272,664 | A | 12/1993 | Alexander et al. | 365/52 |
| 5,661,339 | A | 8/1997 | Clayton | 257/678 |
| 5,767,999 | A * | 6/1998 | Kayner | 398/164 |
| 5,879,173 | A * | 3/1999 | Poplawski et al. | 439/138 |
| 6,135,793 | A * | 10/2000 | Babineau | 439/92 |
| 6,142,802 | A * | 11/2000 | Berg et al. | 439/180 |
| 6,178,096 | B1 * | 1/2001 | Flickinger et al. | 361/816 |
| 6,315,614 | B1 | 11/2001 | Hassanzadeh et al. | 439/633 |
| 6,524,134 | B2 * | 2/2003 | Flickinger et al. | 439/607 |
| 6,648,693 | B1 * | 11/2003 | Hogan et al. | 439/630 |
| 6,731,510 | B1 * | 5/2004 | Hwang et al. | 361/754 |
| 6,793,517 | B2 * | 9/2004 | Neer et al. | 439/372 |
| 6,980,437 | B2 * | 12/2005 | Bright | 361/704 |
| 7,195,403 | B2 * | 3/2007 | Oki et al. | 385/92 |
| 2003/0171013 | A1 * | 9/2003 | Keeble et al. | 439/79 |
| 2003/0171033 | A1 * | 9/2003 | Bright et al. | 439/607 |
| 2003/0176102 | A1 * | 9/2003 | Amorim | 439/540.1 |
| 2004/0085744 | A1 * | 5/2004 | Leeson et al. | 361/816 |
| 2005/0100292 | A1 * | 5/2005 | Malagrino, Jr. | 385/92 |

(Continued)

*Primary Examiner*—Jayprakash N Gandhi
*Assistant Examiner*—Bradley H Thomas
(74) *Attorney, Agent, or Firm*—BainwoodHuang

(57) ABSTRACT

An improved rail includes two side portions, and a mid portion interconnected between the two side portions. The mid portion and the two side portions form a component that defines three sides of a transceiver module space. The rail further includes a blocking structure coupled to the component. The blocking structure is adapted to (i) permit a connecting portion of a transceiver module to connect with a connector when the transceiver module engages the rail and moves into the transceiver module space toward the connector and when a circuit board side of the transceiver module faces the printed circuit board, and (ii) prevent the transceiver module from contacting the connector when the transceiver module engages the rail and moves into the transceiver module space toward the connector and when a heat dissipation side of the transceiver module faces the printed circuit board.

24 Claims, 4 Drawing Sheets

U.S. PATENT DOCUMENTS

2005/0148223 A1* 7/2005 Shirk et al. .................. 439/160
2005/0190540 A1* 9/2005 Shearman et al. ........... 361/715
2006/0126306 A1* 6/2006 Blair et al. ................... 361/716
2006/0189220 A1* 8/2006 Duval et al. ................. 439/760

* cited by examiner

TECHNIQUES FOR CONTROLLING A POSITION OF A TRANSCEIVER MODULE RELATIVE TO A CONNECTOR

BACKGROUND

In general, a fiber optic transceiver is a communications device that transmits and receives fiber optic signals, e.g., through a set of fiber optic cables. Such a device typically secures to a circuit board and electronically conveys data contained within the fiber optic signals to and from electronic circuitry of the circuit board. As a result, the electronic circuitry is capable of performing useful operations, e.g., routing or switching the data, storing the data in a cache or a disk array, etc.

There are a variety of "off-the-shelf" fiber optic transceivers which are available in standardized packages. For example, XENPAK and X2 are standards for pluggable transceiver packages which are optimized for IEEE 802.3ae Ethernet communications. Both the XENPAK standard and the X2 standard are outlined in respective Multi-Source Agreements (MSAs) which are supported by several leading networking component suppliers. As another example, small-form factor (SFF) and small-form factor pluggable (SFP) are standards for transceiver packages which are optimized for high-speed Fibre Channel applications (e.g., 4 Gb/s communications).

In connection with X2, this standard defines a fiber optic transceiver module (hereinafter simply referred to as the X2 module) having a plane-shaped device package and a heat sink which fastens to one side of the device package. The X2 standard further defines a 70-pin electrical connector which mounts to a printed circuit board or PCB (e.g., a front panel, a mid board, a PCI card, etc.), as well as a metallic side rail which attaches to the PCB around three sides of the 70-pin electrical connector with the fourth side of the 70-pin electrical connector remaining exposed. In accordance with the X2 standard, the device package slides within the metallic side rail until a leading edge of the device package electrically connects with the exposed side of the 70-pin electrical connector thus forming a set of electrical connections between circuitry within the X2 module device package and circuitry on the PCB. Such installation is capable of taking place while the 70-pin electrical connector is hot/active/powered, i.e., the X2 module is "hot pluggable" and thus capable of connecting to the 70-pin electrical connector while the PCB is powered up and in operation. At this point, the metallic side rail holds the X2 module firmly in place and operates as an electromagnetic interference (EMI) gasket. Furthermore, the metallic side rail allows unblocked airflow over the full length of the heat sink thus enabling an air stream to provide maximum cooling to the device package and the circuitry contained therein.

SUMMARY

Unfortunately, there are deficiencies to the above-described conventional metallic side rail defined by the X2 standard. For example, in connection with certain "off-the-shelf" X2 modules, the device packages and heat sinks have similar thicknesses thus making it difficult for a user to easily distinguish the device package side of the X2 module from the heat sink side of the X2 module. Moreover, such similarity between device package thickness and the heat sink thickness enables the conventional metallic side rail to conveniently capture the heat sink of the X2 module in a similar manner as when the metallic side rail captures the device package of the X2 module.

If a user inadvertently slides the X2 module into the conventional metallic side rail with the heat sink facing the PCB surface, the heat sink can move along the entire rail until the heat sink contacts the 70-pin electrical connector. If the user inadvertently attempts to install the X2 module in this inverted orientation while the 70-pin electrical connector is powered up and operational, such contact by the heat sink can cause an electrical short between various connector pins of the 70-pin electrical connector or between a connector pin and the conventional metallic side rail which is typically connected to PCB ground. As a result, the 70-pin electrical connector and perhaps circuitry on the PCB may sustain damage.

In some situations, the PCB has conventional metallic rails and 70-pin electrical connectors mounted on both sides and is thus configured to receive X2 modules on both sides. In particular, a top surface of the PCB is configured to receive X2 modules right side up so that the device packages are flush with the top surface. Similarly, a bottom surface of the PCB is configured to receive X2 modules upside down so that the device packages are flush with the bottom surface. As a result, the device packages of the X2 modules always face the PCB, and the heat sinks of the X2 modules always face away from the PCB. Since the PCB receives X2 modules right side up as well as upside down and since the conventional metallic rails are coincidentally dimensioned so that they can easily capture the heat sinks of the X2 modules, there is an increased likelihood that the user will inadvertently insert an X2 module within a conventional metallic side rail in the wrong orientation and thus cause electrical shorting of a 70-pin electrical connector.

In contrast to the above-identified conventional metallic side rail which allows a user to install an X2 module in the wrong orientation and thus cause electrical shorting of a 70-pin electrical connector, an improvement to a circuit board assembly permits a connecting portion of a transceiver module (e.g., an X2 pluggable transceiver module) to connect with a connector (e.g., a 70-pin electrical connector) when the transceiver module engages a rail in a correct orientation, but prevents the transceiver module from contacting the connector when the transceiver module engages the rail in an incorrect orientation. Accordingly, the transceiver module cannot cause inadvertent electrical shorting of the connector if the transceiver module engages the rail in the incorrect orientation (e.g., when a heat sink of the transceiver module faces a circuit board surface on which the connector is mounted).

One embodiment is directed to a circuit board assembly having a PCB (e.g., a front panel, a mid board, a PCI card, etc.), a connector mounted to the PCB, and a rail (e.g., an X2 metallic side rail) fastened to the PCB. The rail is adapted to control positioning of a transceiver module (e.g., a fiber optic pluggable transceiver module) relative to the connector. The transceiver module has a PCB side and a heat dissipation side. The rail includes two side portions, and a mid portion interconnected between the two side portions. The mid portion and the two side portions form a component that defines three sides of a transceiver module space. The rail further includes a blocking structure (e.g., a set of tabs) coupled to the component. The blocking structure is adapted to (i) permit a connecting portion of the transceiver module to connect with the connector when the transceiver module engages the rail and moves into the transceiver module space toward the connector and when the PCB side of the transceiver module faces the PCB, and (ii) prevent the transceiver module from contacting the connector when the transceiver module engages the rail and moves into the transceiver module space toward the connector and when the heat dissipation side of the transceiver module faces the PCB.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

An improvement to a circuit board assembly permits a connecting portion of a transceiver module (e.g., an X2 pluggable transceiver module) to connect with a connector (e.g., a 70-pin electrical connector) when the transceiver module engages a rail (e.g., an X2 metallic side rail) in a correct orientation, but prevents the transceiver module from contacting the connector when the transceiver module engages the rail in an incorrect orientation. Accordingly, the transceiver module cannot cause inadvertent electrical shorting of the connector if the transceiver module engages the rail in the incorrect orientation (e.g., when a heat sink of the transceiver module faces a circuit board surface on which the connector is mounted).

Figure 1:
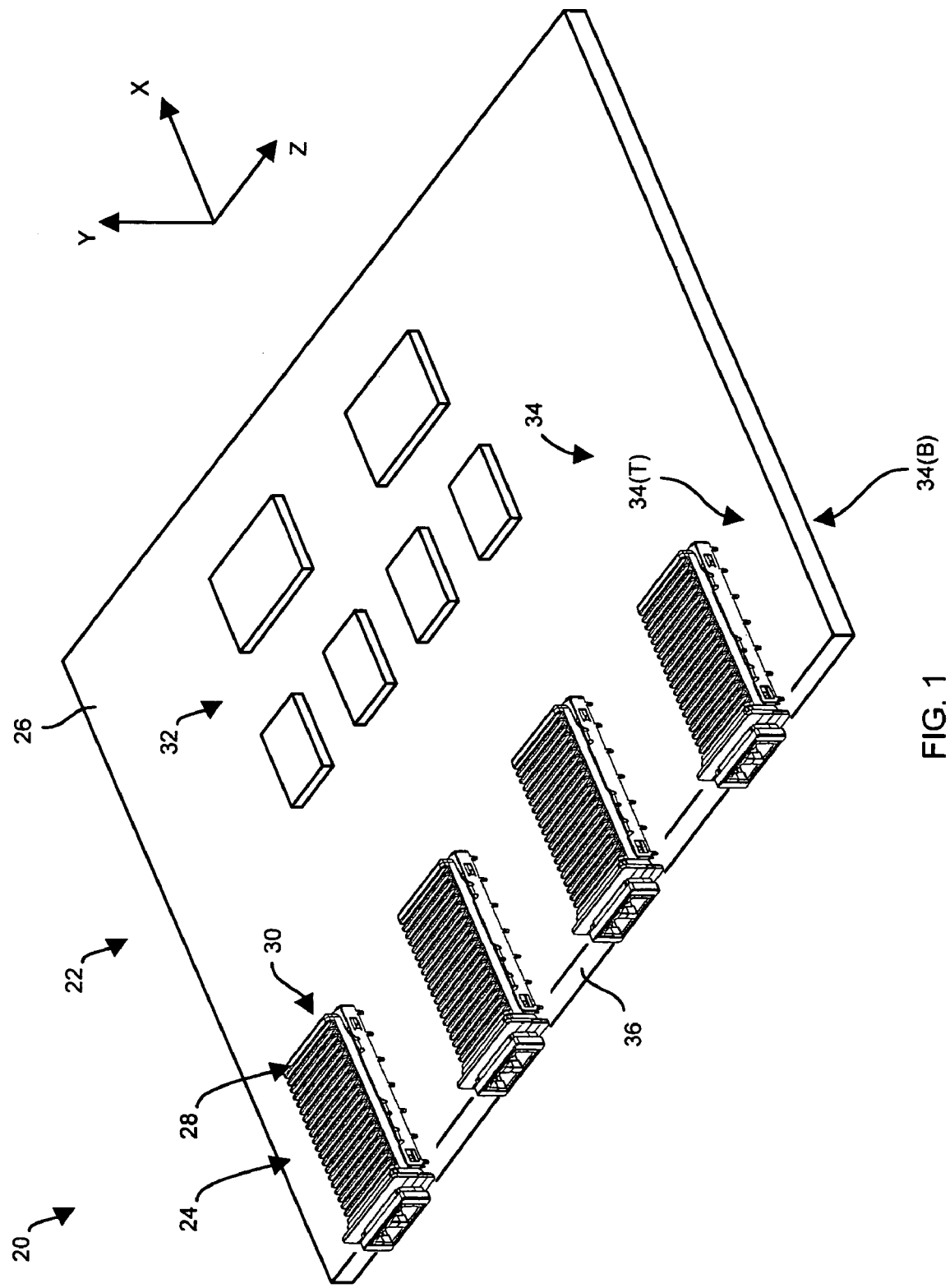
FIG. 1 is a perspective view of an electronic system having an improved circuit board assembly and a set of transceiver modules.

FIG. 1 shows an electronic system 20 which includes a circuit board assembly 22 and a set of transceiver modules 24 (i.e., one or more transceiver modules 24). The circuit board assembly 22 includes a printed circuit board (PCB) 26, a set of connectors 28 (i.e., one or more connectors 28 generally illustrated by the arrow 28 in FIG. 1), a set of rails 30 (i.e., one or more rails 30) and additional circuitry 32 (e.g., integrated circuits, discrete components, etc.). The PCB 26 is plane-shaped within the X-Z plane, and defines a top surface 34(T) and a bottom surface 34(B) (collectively, PCB surfaces 34).

As shown in FIG. 1, the set of rails 30 is configured to hold the set of transceiver modules 24 in place on the top surface 34(T) along an edge 36. In some arrangements, the circuit board assembly 22 includes additional connectors 28 and additional rails 30 mounted to the bottom surface 34(B) along the edge 36 thus enabling the circuit board assembly 22 to support a higher density of transceiver modules 24. In such arrangements, the transceiver modules 24 which are secured to the bottom surface 34(B) are oriented in an inverted manner to those shown in FIG. 1.

During operation, the set of transceiver modules 24 transmit data signals from the circuit board assembly 22 to external locations, as well as receive data signals from external locations for processing by the circuit board assembly 22. Such operation enables the circuit board assembly 22 to process the data (e.g., route the data, cache the data, etc.). Further details of the electronic system 20 will now be provided with reference to FIG. 2.

Figure 2:
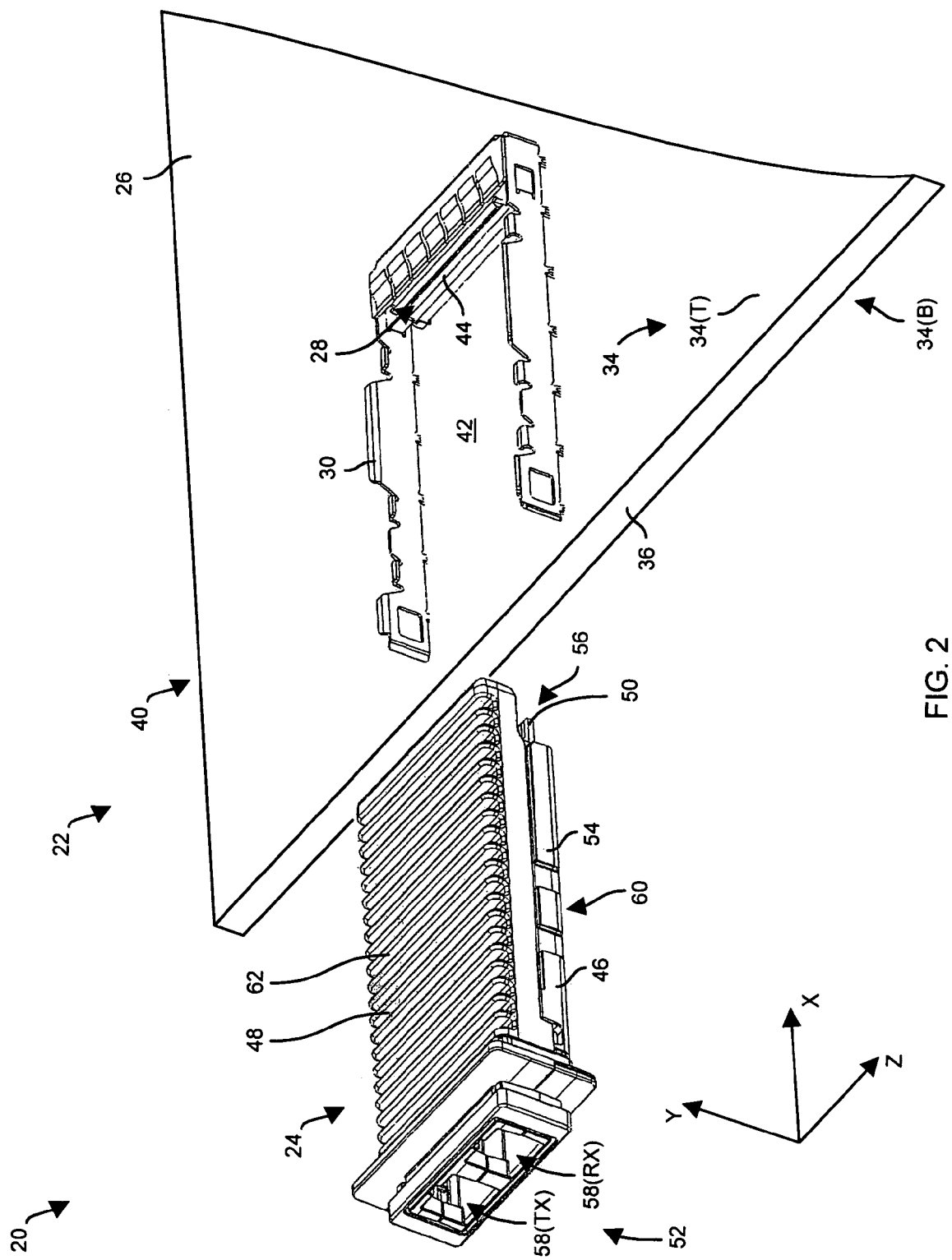
FIG. 2 is a perspective view of a portion of the electronic system of FIG. 1 when a transceiver module is disconnected from the circuit board assembly.

FIG. 2 is a perspective view 40 of a portion of the electronic system 20 of FIG. 1. The view 40 includes part of the circuit board assembly 22 and a transceiver module 24. Although the view 40 shows details of the top surface 34(T) of the PCB 26, the view 40 is equally applicable to the bottom surface 34(B) when the bottom surface 34(B) of the PCB 26 is configured to support one or more transceiver modules 24.

As shown in FIG. 2, one of the transceiver modules 24 is uncoupled from a transceiver module space (or slot) 42 of the circuit board assembly 22 thus revealing further details of a connector 28 and a rail 30. As shown in FIG. 2, both the connector 28 and the rail 30 electrically connect to the PCB 26 (e.g., to conductive planes and signal traces of the PCB 26, etc.). The rail 30 extends around three sides of the connector 28 with the fourth side of the connector 28 remaining exposed. This fourth side of the connector 28 has an electrical interface 44 which faces the transceiver module space 42 and the PCB edge 36.

As further shown in FIG. 2, the transceiver module 24 includes a device package 46 and a heat sink 48 which are in robust thermal communication with each other. The device package 46 includes an electrical interface 50, a fiber optic interface 52 and electronic circuitry 54 coupled to the interfaces 50, 52. The electrical interface 50 resides along a connecting edge 56 of the transceiver module 24 (i.e., a series of electrical contacts which extend along the Z-axis), and the fiber optic interface 52 resides at an end which is opposite the connecting edge 56. The electrical interface 50 of the device package 46 is configured to electrically mate with the electrical interface 44 of the connector 28 to form a set of electrical connections with the PCB 26. Furthermore, the fiber optic interface 52 (e.g., a transmit port 58(TX) and a receive port 58(RX)) is configured to optically mate with a set of fiber optic cables to form a set of fiber optic connections to one or more external devices.

It should be understood that the device package 46 of the transceiver module 24 encloses the circuit board side 60 of the transceiver module 24, and that the heat sink 48 of the transceiver module 24 forms a heat dissipation side 62 of the transceiver module 24. It should be further clear that the transceiver module 24 properly connects with the connector 28 when the circuit board side 60 of the transceiver module 24 faces the PCB 26 and the heat dissipation side 62 of the transceiver module 24 faces away from the PCB 26. When the transceiver module 24 is in this orientation and is moved toward the connector 28 along the rail 30, the electrical interface 50 of the transceiver module 24 properly mates with the electrical interface 44 of the connector 28. Once the transceiver module 24 and connector 28 have mated, the heat sink 48 of the transceiver module 24 remains maximally exposed to dissipate heat from the device package 46. Further details will now be provided with reference to FIGS. 2 and 3.

Figure 3:
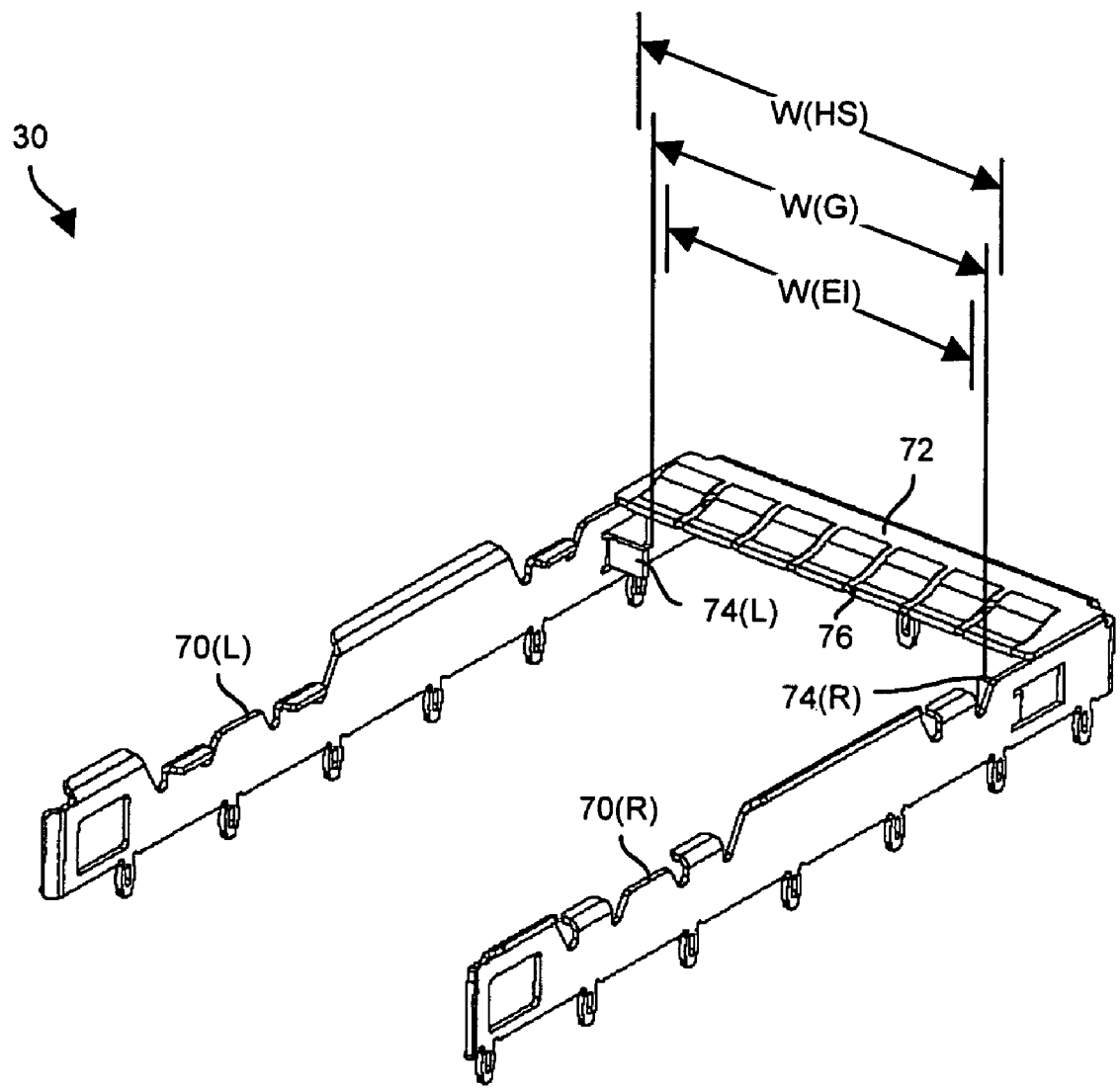
FIG. 3 is detailed view of a rail of the circuit board assembly of FIGS. 1 and 2 in accordance with a particular configuration.
Figure 3:
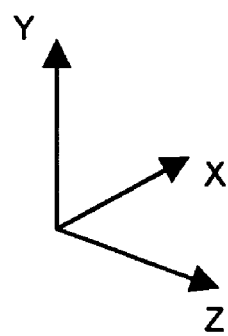

FIG. 3 is detailed perspective view of a rail 30 of the circuit board assembly 22 in accordance with certain embodiments. As shown, the rail 30 has two side portions 70(L), 70(R) (collectively, side portions 70) which extend along the X-direction, a mid portion 72 which extends along the Z-direction, and two tabs 74(L), 74(R) (collectively, tabs 74). Preferably, the tabs 74 (i.e., a blocking structure) extend in a substantially perpendicular manner from the side portions 70 along the Z-axis. Alternatively, the tabs 74 extend from the mid portion 72 along the Y-axis (e.g., from a top edge 76 of the mid portion 72 in the negative Y-direction).

The mid portion 72 interconnects the two side portions 70 to form a C-shaped component that defines three sides of the transceiver module space 42 (also see FIG. 2). Accordingly, the tabs 74 couple to this C-shaped component in a manner such that, when the rail 30 is installed on the PCB 26 around a connector 28, the rail 30 controls positioning of a transceiver module 24 relative to the connector 28. In particular, the tabs 74 of the rail 30 provide enough clearance to permit the electrical interface 50 of the transceiver module 24 to connect with the connector 28 when the transceiver module 24 engages the rail 30 and moves into the transceiver module space 42 toward the connector 28 (i.e., in the positive X-direction of FIG. 2) and when the circuit board side 60 of the transceiver module 24 faces the PCB 26 (i.e., the device package 46 is flush with the surface 34 of the PCB). Additionally, when the heat dissipation side 62 of the transceiver module 24 faces the PCB 26 (i.e., the heat sink 48 is flush with the PCB surface 34), the tabs 74 of the rail 30 provide an inadequate amount of clearance preventing the transceiver module 24 from contacting the connector 28 when the transceiver module 24 engages the rail 30 and moves into the transceiver module space 42 toward the connector 28 (i.e., in the positive X-direction of FIG. 2).

It should be understood that the width W(HS) of the heat sink 48 along the transceiver module edge 56 (i.e., measured along the Z-axis in FIG. 2) is greater than the width W(EI) of the electrical interface 50 along the transceiver module edge 56 (i.e., along the Z-axis). Additionally, it should be understood that the tabs 74 define a gap W(G) which is narrower than the heat sink width W(HS) defined by the heat sink 48, but wider than the interface width W(EI) defined by the electrical interface 50 of the device package 46. Accordingly, if a user attempts to install the transceiver module 24 with the circuit board side 60 facing the PCB 26, the electrical interface 50 will easily pass through the gap W(G) defined by the tabs 74 (also see FIG. 3) because the gap W(G) is wider than the interface width W(EI). However, if the user attempts to install the transceiver module 24 with the heat dissipation side 62 facing the PCB 26, the heat sink 48 will interfere with the tabs 74 because the gap W(G) is narrower than the heat sink width W(HS). As a result, if the transceiver module 24 engages the rail 30 in the incorrect orientation (e.g., when the heat sink 48 of the transceiver module 24 faces the PCB surface 34 on which the connector 28 is mounted), the transceiver module 24 cannot contact the connector 28 and cannot cause inadvertent electrical shorting of the connector 28. Thus, the circuit board assembly 22 is protected against damage.

In some arrangements, the two side portions 70, the mid portion 72, and the tabs 74 are formed as a unitary body of homogenous metallic material from single piece of cut and bent metal stock (e.g., by stamping and pressing sheet metal). Such arrangements provide the advantages of high strength, low manufacturing costs, and robust EMI shielding around a connector 28 when the rail 30 fastens to the PCB 26 around the connector 28. In particular, the tabs 74 derive strength from being integral with other portions of the rail 30. In some arrangements, the tabs 74 are integral with the side portions 70 as shown in FIG. 3. In alternative arrangements, the tabs 74 are integral with the mid portion 72. Further details will now be provided with reference to FIG. 4.

Figure 4:
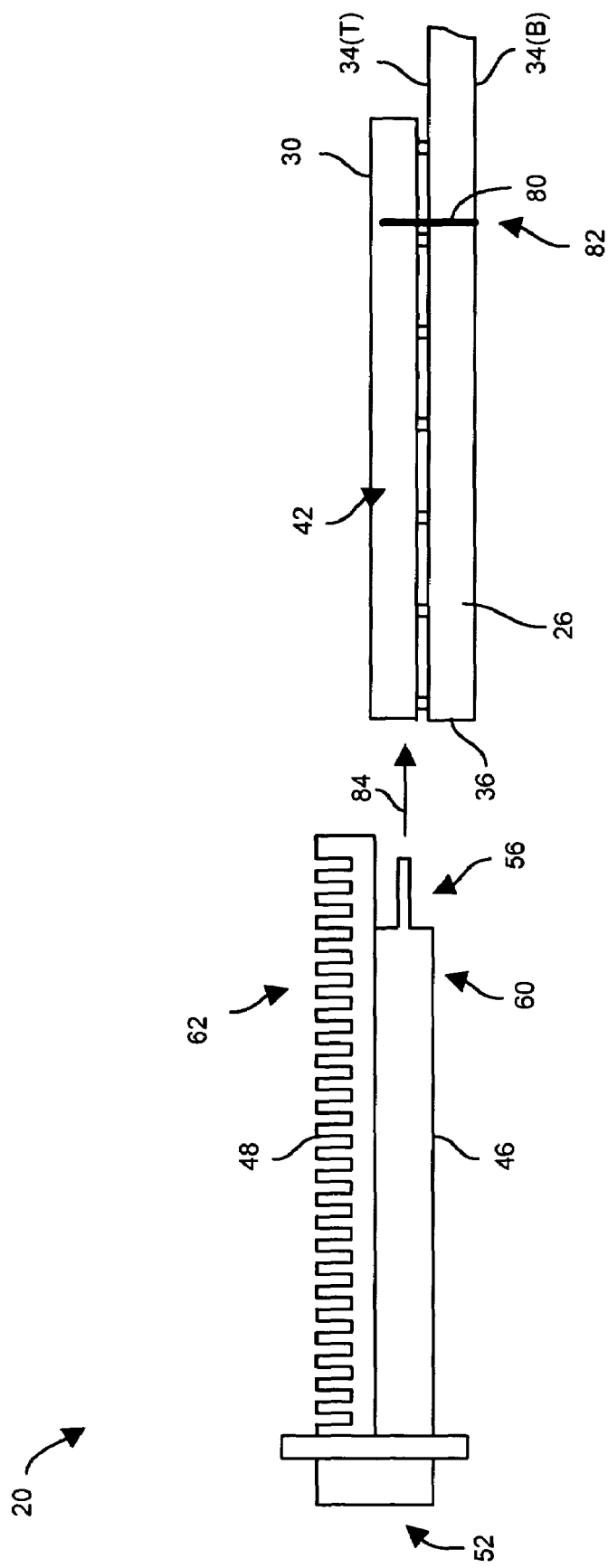
FIG. 4 is a general cross-sectional side view of various components of the electronic system of FIG. 1 in accordance with an alternative configuration.

FIG. 4 is a general cross-sectional side view of various components of the electronic system 20 in accordance with alternative embodiments to those described above with reference to FIG. 3. As shown in FIG. 4, the PCB 26 includes a set of pins/tabs 80 (i.e., one or more pins, posts, pegs, tabs, similar types of members, etc.) which is rigidly fastened to a set of plated through holes 82 (e.g., using solder, using a press-fit mechanism such as eye-of-the-needle, etc.). The pins 80 extend from the PCB 26 in the positive Y-direction.

In contrast to the earlier-described tabs 74 which form part of the rail 30 (see FIG. 3), spacing between the set of pins 80 determined by the pin mounting positions on the PCB 26 (FIG. 4). Specifically, the pins 80 operate in the same manner as the earlier-described tabs 74 and, thus, define the gap width W(G). Accordingly, if the user attempts to install the transceiver module 24 with the device package 46 (i.e., circuit board side 60) facing the PCB 26 (see the arrow 84 in FIG. 4), the electrical interface 50 will easily pass through the gap W(G) defined by the tabs 74 because the gap width W(G) is wider than the interface width W(EI). On the other hand, if the user attempts to install the transceiver module 24 with the heat sink 48 (i.e., the heat dissipation side 60) facing the PCB 26, the heat sink 48 will interfere with the tabs 74 because the gap W(G) is narrower than the heat sink width W(HS). Such operation prevents the heat sink 48 from inadvertently contacting the connector 28 if the user accidentally attempts to install the transceiver module 24 into the transceiver module space 42 in the wrong orientation.

It should be understood that the above-described embodiments for the electronic system 20 are well-suited for certain technologies such as those involving connection of standard packaged fiber optic transceivers (e.g., XENPAK, X2, SSF, SFP, etc.). For instance, in some arrangements, the transceiver modules 24 are compact 10 Gigabit/s optical transceivers for IEEE 802.3ae Ethernet communications. In these arrangements, particular dimensions for the rails 30 and the transceiver modules 22 are defined by a Multi-Source Agreement (MSA) that is supported by several leading networking component suppliers. The MSA further defines an X2 70-pin connecting profile for the connector 28. In order to properly control positioning of the X2 modules (i.e., transceiver modules 24), the tabs 74 (in the embodiment shown in FIG. 3) and the pins 80 (in the embodiment shown in FIG. 4) define, as the gap width W(G), an opening which is wider than the X2 70-pin connecting profile. In some arrangements, when the transceiver module 24 is fully installed within the transceiver module space 42 and connected to the connector 28, the tabs 74 (FIG. 3) or the pins 80 (FIG. 4), both of which are generally considered to be tabs, preferably reside distally from the fiber optic interface 52 and proximate to the electrical interface 50 in order to remain protected against inadvertent damage (e.g., bending).

As described above, an improvement to a circuit board assembly 22 permits a connecting portion 50 of a transceiver module 24 to connect with a connector 28 when the transceiver module 24 engages a rail 30 in a correct orientation. However the circuit board assembly 22 prevents the transceiver module 24 from contacting the connector 28 when the transceiver module 24 engages the rail 30 in an incorrect orientation. Accordingly, the transceiver module 24 cannot cause inadvertent electrical shorting of the connector 28 if the transceiver module 24 engages the rail 30 in the incorrect orientation (e.g., when a heat sink 48 of the transceiver module 48 faces a circuit board surface 34 on which the connector 28 is mounted).

While this invention has been particularly shown and described with references to preferred embodiments thereof, it will be understood by those skilled in the art that various changes in form and details may be made therein without departing from the spirit and scope of the invention as defined by the appended claims.

For instance, it should be understood that the transceiver modules 24 were described above as being X2 fiber optic pluggable transceiver modules by way of example only. In other arrangements, the modules 24 are non-fiber optic (e.g., electrical modules, wireless modules, infrared modules, etc.).

Additionally, it should be understood that the embodiment of FIG. 3 was described above as including a set of tabs 74 (i.e., at least one tab) and, the embodiment of FIG. 4 was described above as including a set of pins/tabs 80 (at least one pin/tab 80) are configured to block a transceiver module 24 from contacting a connector 28 when the transceiver module 24 is in the wrong orientation. It should be further understood that the only one tab 74/80 is required to properly obstruct the transceiver module 24. Along these lines, in some arrangements, the tab 74/80 exists on only one side (e.g., only the tab 74(L), only the tab 74(R), etc.).

Furthermore, it should be understood that the embodiments of FIGS. 3 and 4 were provided by way of example only. Other embodiments use blocking structures similar to the tabs 74/80 such as pegs, side tabs, top tabs, tabs from the back or mid portion 72, various combinations thereof, and so on. Virtually any blocking structure that prevents the transceiver module 24 from inadvertently contacting the connector 28 when the transceiver module 24 is in the wrong orientation is suitable for use.

Moreover, in some arrangements, there is a reinforcing structure that prevents tabs from bending or being overpowered by the user. For example, in some arrangements, the tabs 74 (FIG. 3) are reinforced from behind by blocking members (e.g., the tabs/pins 80 of FIG. 4). Such arrangements involve strengthening of the tabs 74 to prevent tab failure due to excess insertion force on the transceiver module 24 by the user.

Additionally, it should be understood that some arrangements do not involve the use of a PCB in the rail area. In such arrangements, the rails 30 look and operate more like cages which house the modules 24. In these arrangements, blocking structures still preferably exist (see the tabs 74/80 in FIGS. 3 and 4) to prevent inadvertent contact between modules 24 and connectors 28 when the modules 24 are inserted in the wrong orientations.

What is claimed is:

1. An electronic system, comprising:
    a transceiver module having a circuit board side and a heat dissipation side; and
    a circuit board assembly having a printed circuit board, a connector mounted to the printed circuit board, and a rail fastened to the printed circuit board, the rail being adapted to control positioning of the transceiver module relative to the connector, the rail including:
        two side portions that define two sides of a transceiver module space,
        a mid portion interconnected between the two side portions, the mid portion and the two side portions forming a component, and
        a blocking structure coupled to the component; the blocking structure being adapted to (i) permit a connecting portion of the transceiver module to connect with the connector when the transceiver module engages the rail and moves into the transceiver module space toward the connector and when the circuit board side of the transceiver module faces the printed circuit board, and (ii) prevent the transceiver module from contacting the connector when the transceiver module engages the rail and moves into the transceiver module space toward the connector and when the heat dissipation side of the transceiver module faces the printed circuit board wherein the blocking structure is adapted to provide interference against the heat dissipation side of the transceiver module when (i) the transceiver module is substantially disposed between the two side portions of the rail and (ii) the heat dissipation side of the transceiver module contacts the printed circuit board.

2. The electronic system of claim 1 wherein the transceiver module includes:
    a device package having, as the connecting portion of the transceiver module, an electrical interface disposed along a connecting edge of the transceiver module, the electrical interface defining an interface width along the connecting edge of the transceiver module, and
    a heat sink in thermal communication with the device package, the heat sink defining a heat sink width along the connecting edge of the transceiver module, the heat sink width being greater than the interface width; and
wherein the blocking structure of the rail defines a gap which is wider than the interface width defined by the electrical interface of the device package and narrower than the heat sink width defined by the heat sink.

3. The electronic system of claim 2 wherein the blocking structure includes a set of tabs; and wherein each tab of the set of tabs projects from a respective side portion in a substantially perpendicular manner relative to that respective side portion, a distance between the tabs being the gap.

4. The electronic system of claim 3 wherein the mid portion, the two side portions and the tabs are formed as a unitary body of homogenous metallic material from a single piece of cut and bent metal stock.

5. The electronic system of claim 3 wherein part of the component is adapted to provide electromagnetic interference shielding around the connector when the component fastens to the printed circuit board, and wherein the tabs are disposed adjacent the part of the component adapted to provide the electromagnetic interference shielding around the connector.

6. The electronic system of claim 3 wherein the electrical interface provides an X2 Multi-Source Agreement 70-pin connecting profile; and
    wherein the tabs define, as the gap, an opening which is wider than the X2 Multi-Source Agreement 70-pin connecting profile.

7. The electronic system of claim 6 wherein the device package of the transceiver module has a fiber optic interface along a side which is opposite the electrical interface, the fiber optic interface being adapted to provide 10 Gigabit/second optical communications; and wherein the tabs are disposed distally from the fiber optic interface and proximate to the electrical interface when the transceiver module is (i) properly installed within the transceiver module space and (ii) electrically mated with the connector mounted to the printed circuit board.

8. An electronic system as in claim 1 wherein the transceiver module moves in a connecting direction relative to the rail and the connector when the transceiver module connects with the connector (i) while the transceiver module engages the rail and moves into the transceiver module space toward the connector and (ii) while the circuit board side of the transceiver module faces the printed circuit board, the connecting direction being substantially parallel to each of the two side portions of the rail and a surface of the printed circuit board; and
    wherein the blocking structure is arranged to contact the transceiver module and provide interference against the transceiver module when the blocking structure prevents the transceiver module from contacting the connector (i) while the transceiver module engages the rail and moves into the transceiver module space toward the connector in the connecting direction and (ii) while the heat dissipation side of the transceiver module faces the printed circuit board.

9. The electronic system of claim 1 wherein the blocking structure is adapted to provide interference against the heat dissipation side of the transceiver module to prevent the transceiver module from contacting the connector when the heat dissipation side of the transceiver module is substantially disposed between the two side portions of the rail.

10. A circuit board assembly, comprising:
a printed circuit board;
a connector mounted to the printed circuit board; and
a rail fastened to the printed circuit board, the rail being adapted to control positioning of a transceiver module relative to the connector, the transceiver module having a circuit board side and a heat dissipation side, the rail including:
two side portions that define two sides of a transceiver module space,
a mid portion interconnected between the two side portions, the mid portion and the two side portions forming a component, and
a blocking structure coupled to the component; the blocking structure being adapted to (i) permit a connecting portion of the transceiver module to connect with the connector when the transceiver module engages the rail and moves into the transceiver module space toward the connector and when the circuit board side of the transceiver module faces the printed circuit board, and (ii) prevent the transceiver module from contacting the connector when the transceiver module engages the rail and moves into the transceiver module space toward the connector and when the heat dissipation side of the transceiver module faces the printed circuit board wherein the blocking structure is adapted to provide interference against the heat dissipation side of the transceiver module when (i) the transceiver module is substantially disposed between the two side portions of the rail and (ii) the heat dissipation side of the transceiver module contacts the printed circuit board.

11. The circuit board assembly of claim 10 wherein the transceiver module includes:
a device package having, as the connecting portion of the transceiver module, an electrical interface disposed along a connecting edge of the transceiver module, the electrical interface defining an interface width along the connecting edge of the transceiver module, and
a heat sink in thermal communication with the device package, the heat sink defining a heat sink width along the connecting edge of the transceiver module, the heat sink width being greater than the interface width; and
wherein the blocking structure of the rail defines a gap which is wider than the interface width defined by the electrical interface of the device package and narrower than the heat sink width defined by the heat sink.

12. The circuit board assembly of claim 11 wherein the blocking structure includes a set of tabs; and wherein each tab of the set of tabs projects from a respective side portion in a substantially perpendicular manner relative to that respective side portion, a distance between the tabs being the gap.

13. The circuit board assembly of claim 12 wherein the mid portion, the two side portions and the tabs are formed as a unitary body of homogenous metallic material from a single piece of cut and bent metal stock.

14. The circuit board assembly of claim 12 wherein part of the component is adapted to provide electromagnetic interference shielding around the connector when the component fastens to the printed circuit board, and wherein the tabs are disposed adjacent the part of the component adapted to provide the electromagnetic interference shielding around the connector.

15. The circuit board assembly of claim 12 wherein the electrical interface provides an X2 Multi-Source Agreement 70-pin connecting profile; and wherein the tabs define, as the gap, an opening which is wider than the X2 Multi-Source Agreement 70-pin connecting profile.

16. The circuit board assembly of claim 13 wherein the device package of the transceiver module has a fiber optic interface along a side which is opposite the electrical interface, the fiber optic interface being adapted to provide 10 Gigabit/second optical communications; and
wherein the tabs are disposed distally from the fiber optic interface and proximate to the electrical interface when the transceiver module is (i) properly installed within the transceiver module space and (ii) electrically mated with the connector mounted to the printed circuit board.

17. A circuit board assembly as in claim 10 wherein the transceiver module moves in a connecting direction relative to the rail and the connector when the transceiver module connects with the connector (i) while the transceiver module engages the rail and moves into the transceiver module space toward the connector and (ii) while the circuit board side of the transceiver module faces the printed circuit board, the connecting direction being substantially parallel to each of the two side portions of the rail and a surface of the printed circuit board; and
wherein the blocking structure is arranged to contact the transceiver module and provide interference against the transceiver module when the blocking structure prevents the transceiver module from contacting the connector (i) while the transceiver module engages the rail and moves into the transceiver module space toward the connector in the connecting direction and (ii) while the heat dissipation side of the transceiver module faces the printed circuit board.

18. A rail adapted to control positioning of a transceiver module relative to a connector mounted to a printed circuit board, the transceiver module having a circuit board side and a heat dissipation side, the rail comprising:
two side portions that define two sides of a transceiver module space when fastened to the printed circuit board;
a mid portion interconnected between the two side portions, the mid portion and the two side portions forming a component; and
a blocking structure coupled to the component; the blocking structure being adapted to (i) permit a connecting portion of the transceiver module to connect with the connector when the transceiver module engages the rail and moves into the transceiver module space toward the connector and when the circuit board side of the transceiver module faces the printed circuit board, and (ii) prevent the transceiver module from contacting the connector when the transceiver module engages the rail and moves into the transceiver module space toward the connector and when the heat dissipation side of the transceiver module faces the printed circuit board wherein the blocking structure is adapted to provide interference against the heat dissipation side of the transceiver module when (i) the transceiver module is substantially disposed between the two side portions of the rail and (ii) the heat dissipation side of the transceiver module contacts the printed circuit board.

19. The rail of claim 18 wherein the transceiver module includes:
   a device package having, as the connecting portion of the transceiver module, an electrical interface disposed along a connecting edge of the transceiver module, the electrical interface defining an interface width along the connecting edge of the transceiver module, and
   a heat sink in thermal communication with the device package, the heat sink defining a heat sink width along the connecting edge of the transceiver module, the heat sink width being greater than the interface width; and
wherein the blocking structure of the rail defines a gap which is wider than the interface width defined by the electrical interface of the device package and narrower than the heat sink width defined by the heat sink.

20. The rail of claim 19 wherein the blocking structure includes a set of tabs; and wherein each tab of the set of tabs projects from a respective side portion in a substantially perpendicular manner relative to that respective side portion, a distance between the tabs being the gap.

21. The rail of claim 20 wherein the mid portion, the two side portions and the tabs are formed as a unitary body of homogenous metallic material from a single piece of cut and bent metal stock.

22. The rail of claim 20 wherein part of the component is adapted to provide electromagnetic interference shielding around the connector when the component fastens to the printed circuit board, and wherein the tabs are disposed adjacent the part of the component adapted to provide the electromagnetic interference shielding around the connector.

23. A rail as in claim 18 wherein the transceiver module moves in a connecting direction relative to the rail and the connector when the transceiver module connects with the connector (i) while the transceiver module engages the rail and moves into the transceiver module space toward the connector and (ii) while the circuit board side of the transceiver module faces the printed circuit board, the connecting direction being substantially parallel to each of the two side portions of the rail and a surface of the printed circuit board; and
   wherein the blocking structure is arranged to contact the transceiver module and provide interference against the transceiver module when the blocking structure prevents the transceiver module from contacting the connector (i) while the transceiver module engages the rail and moves into the transceiver module space toward the connector in the connecting direction and (ii) while the heat dissipation side of the transceiver module faces the printed circuit board.

24. A rail adapted to control positioning of a transceiver module relative to a connector mounted to a printed circuit board, the transceiver module having a circuit board side and a heat dissipation side, the rail comprising:
   two side portions that define two sides of a transceiver module space when fastened to the printed circuit board;
   a mid portion interconnected between the two side portions, the mid portion and the two side portions forming a component; and
   means for (i) permitting a connecting portion of the transceiver module to connect with the connector when the transceiver module engages the rail and moves into the transceiver module space toward the connector and when the circuit board side of the transceiver module faces the printed circuit board and (ii) preventing the transceiver module from contacting the connector when the transceiver module engages the rail and moves into the transceiver module space toward the connector and when the heat dissipation side of the transceiver module faces the printed circuit board wherein the means is adapted to provide interference against the heat dissipation side of the transceiver module when (i) the transceiver module is substantially disposed between the two side portions of the rail and (ii) the heat dissipation side of the transceiver module contacts the printed circuit board.

* * * * *

UNITED STATES PATENT AND TRADEMARK OFFICE
CERTIFICATE OF CORRECTION

PATENT NO.        : 7,433,193 B2
APPLICATION NO.   : 11/126993
DATED             : October 7, 2008
INVENTOR(S)       : Alan Yee, Eric Wiles and Samir Vasavda It is certified that error appears in the above-identified patent and that said Letters Patent is hereby corrected as shown below:

Claim 16, Column 10, Line 13, "claim 13" should read --claim 15--.

Signed and Sealed this

Second Day of December, 2008

JON W. DUDAS
*Director of the United States Patent and Trademark Office*